United States Patent [19]

Spoeth, Jr.

[11] 4,241,946
[45] Dec. 30, 1980

[54] DETACHABLE HANDLE ASSEMBLY

[75] Inventor: Carl R. Spoeth, Jr., Kewaskum, Wis.

[73] Assignee: Dart Industries Inc., Los Angeles, Calif.

[21] Appl. No.: 961,309

[22] Filed: Nov. 16, 1978

Related U.S. Application Data

[63] Continuation of Ser. No. 780,936, Mar. 24, 1977, which is a continuation of Ser. No. 642,437, Dec. 19, 1975.

[51] Int. Cl.² ............................................. A47J 45/07
[52] U.S. Cl. .................................................. 294/31 R
[58] Field of Search ..................... 294/31 R, 16, 27 R, 294/30, 33; 16/114, 110 R, 110 A, 110.5, 144 A, 166 R; 220/94 R

[56] References Cited

U.S. PATENT DOCUMENTS

| 3,157,909 | 11/1964 | Schmitt | 294/31 R |
| 3,272,547 | 9/1966 | Pryce | 294/31 R |
| 3,306,647 | 2/1967 | Imhoff | 294/31 R |

Primary Examiner—James B. Marbert
Attorney, Agent, or Firm—Kenneth J. Hovet

[57] ABSTRACT

A handle assembly is provided which can be releasably attached to a utensil side handle. The assembly includes a handle member having a connector end and an opposing outer end. The member includes an open channel extending along at least a major portion of its longitudinal axis. Within the channel is provided an elongated insert which is pivotally connected adjacent the handle member connector end. A lever means having a connector portion and a cammed engagement portion is secured to the insert. The connector portion is adapted to engage the utensil side handle, whereas the cammed engagement portion is adapted to releasably engage a rocker-arm assembly located proximate the handle member opposing outer end.

The rocker-arm assembly being located adjacent the outer end of the handle member can be readily manipulated to connect with the cammed engagement portion of the lever. As the insert is rotated within the handle assembly, it becomes engaged or disengaged with the rocker-arm assembly, which in turn rotates the connector portion of the lever into frictional engagement with the utensil side handle.

7 Claims, 10 Drawing Figures

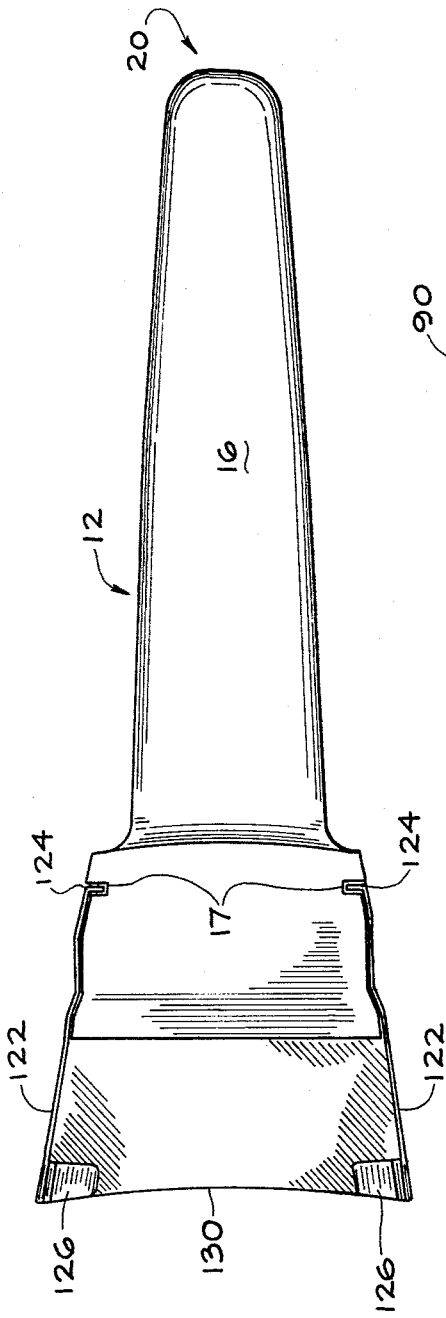
FIG. 5.
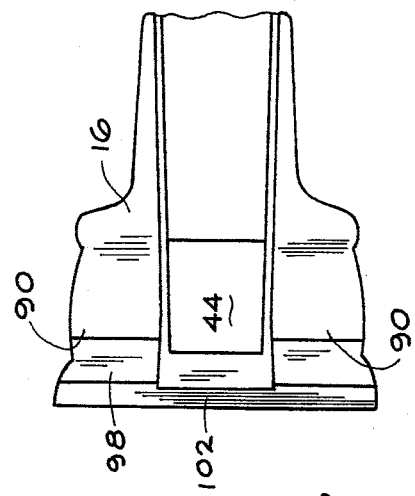
FIG. 10.
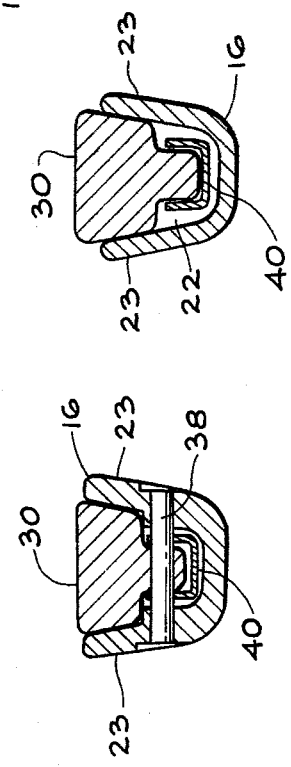
FIG. 8.
FIG. 7.

4,241,946

DETACHABLE HANDLE ASSEMBLY

This is a continuation of application Ser. No. 780,936, filed Mar. 24, 1977 which is a continuation of Ser. No. 642,437 filed Dec. 19, 1975.

BACKGROUND OF THE INVENTION

1. Field of the Invention

The present invention relates to a detachable handle assembly and, more particularly, to a handle assembly which can be releasably attached to a cooperating utensil side handle.

2. Description of the Prior Art

Because of space limitations in one's kitchen and the relative high cost of cookware, it is a desirable objective to have cooking utensils which are as versatile as possible. This is especially true when one obtains cookware of high quality which will likely last many years. Many types of cookware, such as pots or kettles, utilize opposing abbreviated side handles. Other utensils, such as skillets, or sauce pans, have one elongated handle. Of course, having an elongated handle is desirable when one wishes to hold the utensil with one hand while simultaneously stirring the utensil contents with the other. To allow one to manipulate a pot or kettle having short opposing side handles, elongated detachable handles have been provided. Such handles, however, frequently become safety hazards in that they do not rigidly secure themselves to the utensil side handle. Attempts to overcome this problem results in a side handle that is difficult to connect and disconnect.

SUMMARY OF THE INVENTION

In accordance with the present invention, a detachable handle assembly is provided which can be readily connected to a cooperating utensil side handle. The connection is simple, but reliable, and can be made repetitively without loss of effectiveness. The assembly includes a U-shaped in cross-section handle member into which is fitted an elongated rotatable insert. The insert is pivotally connected near its front end to the handle member.

Secure to the bottom of the insert is an elongated lever plate. The plate extends axially beyond the front end of the insert to form a convex connector portion and extends axially beyond the rear end of the insert to present a cammed engagement portion for a rocker-arm assembly.

The rear end of the handle member is provided with a rocker-arm assembly having a midsection with a projection for engaging the cammed engagement portion of the lever. The rocker arm includes a tab section for depressing the member and disengaging it from the cammed engagement portion. The rocker-arm assembly is spring biased by a compression-spring means which operates to separate or disengage the rocker-arm assembly from the insert lever.

The handle member front-connector portion includes an upper extension which engages a utensil side handle top surface. The utensil side handle includes an underside depression which cooperates with the convex connector portion such that when the insert is depressed and the rocker-arm assembly is moved into engagement with the lever cam surface, the connector portion will move into the side handle depression. A firm engagement results with the connector portion pressing the utensil side handle against the handle member upper extension.

The handle member includes a bottom leverage surface which abuts against a matching surface of the side handle. The handle assembly further includes a housing which partially encloses the connector end of the assembly. The housing includes a top wall and opposing sidewalls wherein each of the opposing sidewalls is provided with lateral appendages extending inwardly which operate to abut corresponding surfaces on the underside of the utensil side handle.

BRIEF DESCRIPTION OF THE DRAWINGS

FIG. 5 is a bottom plan view of the detachable handle of FIG. 1.

FIG. 7 is a sectional view taken along lines 7—7 of FIG. 3.

FIG. 8 is a sectional view taken along lines 8—8 of FIG. 3.

FIG. 10 is a fragmentary plan view of the connector end of the detachable handle of FIG. 1.

DESCRIPTION OF THE PREFERRED EMBODIMENT

Figure 1:
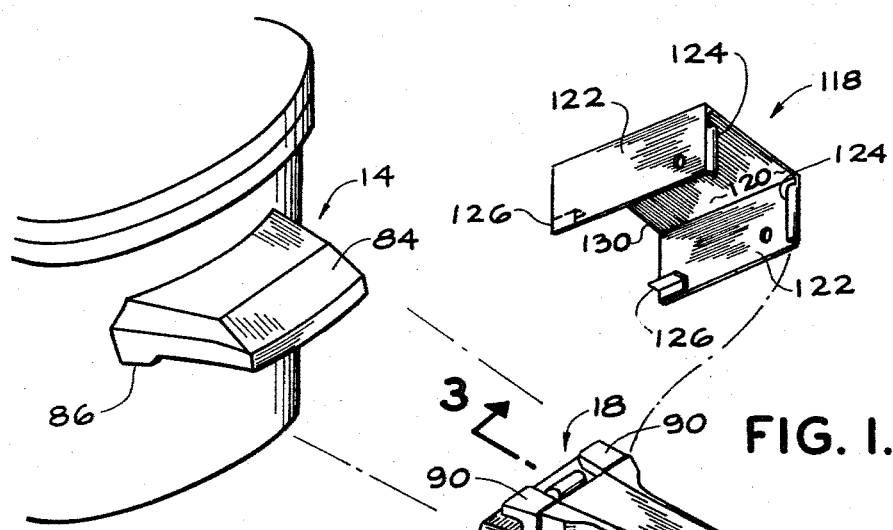
FIG. 1 is an exploded perspective view showing the detachable handle and protector housing of the present invention spaced apart from a utensil side handle.
Figure 3:
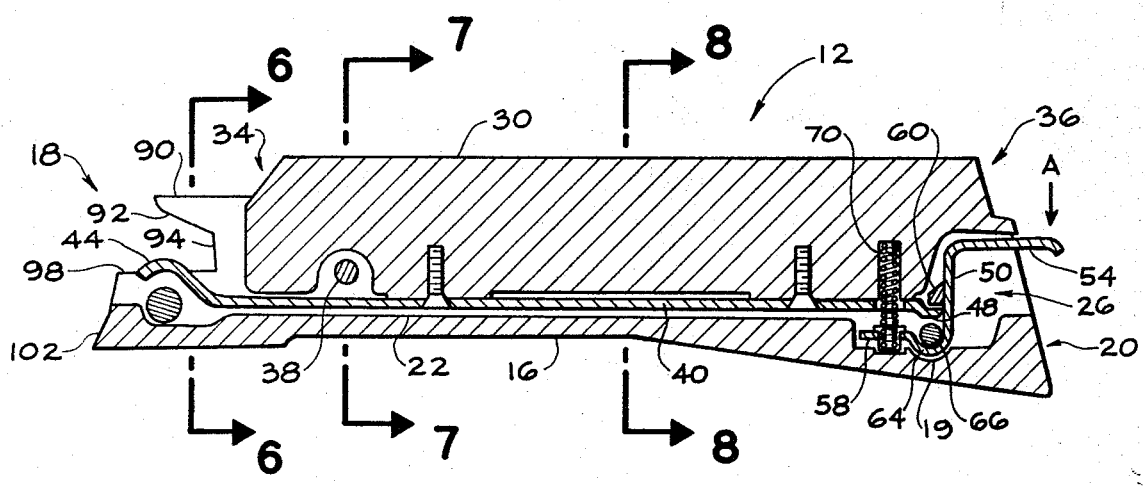
FIG. 3 is a side elevation sectional view taken along lines 3—3 of FIG. 1 showing the handle in a closed position.

Referring now with greater particularity of the various figures of the drawings, it will be seen that numeral 12 refers generally to the detachable handle, and numeral 14 refers to the utensil side handle which, when joined together, cooperate to embody the improved device of the present invention. As illustrated in FIGS. 1 and 3, the detachable handle includes a handle member 16 having a connector end shown generally by numeral 20. A rocker-arm assembly 26 is located proximate the outer end 20.

The handle member is provided with an open channel 22 along at least a major portion of the longitudinal axis thereof which partially encloses an elongated insert 30. The insert has a pivot end 34 and a terminal end 36. The insert is pivotally mounted for rotation near pivot end 34 within the channel 22 by a connector 38 extending across sidewalls 23. Affixed to the bottom surfaces of the insert is lever means 40. The lever means comprises an elongated plate member having a convex connector portion 44 and a cammed engagement portion 48.

The rocker-arm assembly 26 comprises a midsection 50 which is integral with a tab end section 54 and a retainer end section 58. The tab end section and retainer end section extend about transversely from the midsection in about opposite directions. The midsection 50 includes a projection means 60 which is adapted to engage the cammed engagement portion 48 of the lever 40. An enlarged junction corner 64 defines the merging of the midsection 50 with the retainer end section 58.

The junction corner is adapted to rotate about a pivot pin 66 which extends transversely across the handle member channel 22 and is located within the junction corner. The pin maintains the junction corner in rotatable contact with a pivot portion 19 proximate the handle member outer end.

Figure 4:
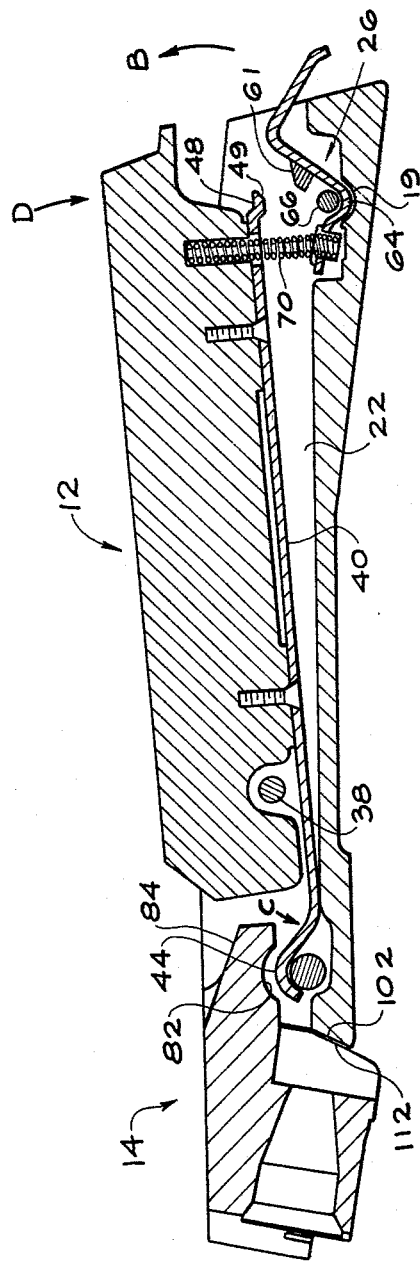
FIG. 4 is a side elevation sectional view of the utensil side handle and detachable handle of FIG. 1 joined together but not engaged.
Figure 6:
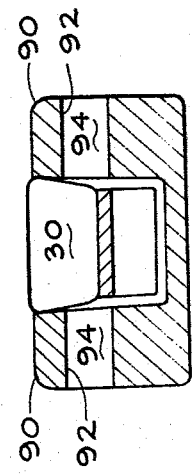
FIG. 6 is a sectional view taken along lines 6—6 of FIG. 3.

A compression means shown as coil spring 70 is secured to the insert near terminal end 36 and connects with the rocker-arm assembly at retainer end section 58. The coil spring exerts opposing axial forces against the insert and handle member and operates to bias the detachable handle assembly to an open position as shown in FIG. 4.

Figure 9:
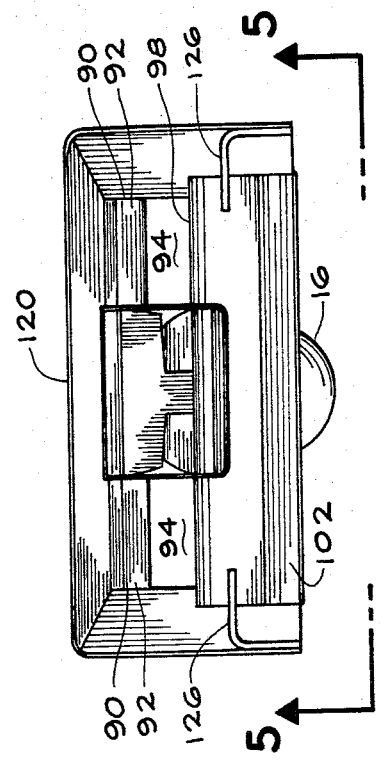
FIG. 9 is an end elevation view of the detachable handle of FIG. 1.

Referring now to the connector end 18 of the handle 16, FIGS. 9 and 10 show bifurcated upper extensions 90 extending axially outwardly from the handle. The extensions include an under surface 92 which matches a corresponding surface 84 of the utensil side handle. Located below the extensions 90 are handle insert portions 94 which merge into a lower portion handle extension portion 98. The lower handle extension has a terminal end surface 102 which abuts against a corresponding area 112 of the utensil side handle.

It will be understood from the rocker-arm assembly description that one may cause the rotation of the rocker arm, constrained between the pivot pin 66 and pivot portion 19, by depressing the tab end section 54 in the direction shown by arrow A in FIG. 3. Depression of the tab end section 54 will result in the disengagement of the projection 60 from the cammed engagement portion 48. Because spring 70 is in a compressed state, the insert and lever assembly will rotate upwardly about connector 38 in the direction shown by arrow B in FIG. 4. Of course, it will be appreciated that the upward rotation of the insert and lever assembly will result in the downward movement of the connector portion 44 as shown by arrow C.

In the preferred embodiment, the projection means 60 includes a cammed surface 61 which cooperates with cam surface 49 of the cammed engagement portion. In this manner, a reversal of the above-described process will allow the re-engagement of the projection means and cammed engagement portion by a downward force against the top end if the insert shown by arrow D. A downward force when the detachable handle assembly is joined with the utensil side handle as shown in FIG. 4 will result in the upward movement of the connector portion 44 against depression 82 of utensil side handle 14. The inclined top surfaces 84 of the side handle will abut against the undersides 92 of connector end extensions 90 and provide a firm frictional engagement therebetween.

As mentioned hereinabove, the connector portion 44 of the lever 40 is spaced vertically apart from the bottom surfaces 92 of the extensions 90. The distance is at least greater than the distance between the side handle surface 84 and concave depression 82 when the handle assembly is in the open position as depicted in FIG. 4. Of course, when the handle assembly is in the closed position as illustrated in FIG. 3, the connector portion will resiliently engage the side handle due to the inherent resilience of the lever. A firm engagement is created by the connector portion 44 forcing the side handle beveled surface 84 against the surfaces 92 of extensions 90. The convex-to-concave engagement of connector portion 44 to depression 82 further facilitates a strong engagement.

It is advantageous to have the lever 40 constructed of a resilient strip of metal. In the preferred embodiment, the resilience of the connector portion is further enhanced by forming the lever into a U-shaped cross sectional structure as illustrated in FIGS. 7 and 8.

Referring again to FIG. 1 and to FIGS. 5 and 9, the connector end 18 is shown at least partially enclosed by a housing member 118. The housing member includes a top surface 120 with integral opposing sidewalls 122. One end of each of the sidewalls is provided with an inwardly directed flanged edge portion 124. The flanged edges are adapted to engage cooperating grooves 17 of the handle member 16 when mounted over the connector end 18.

Figure 2:
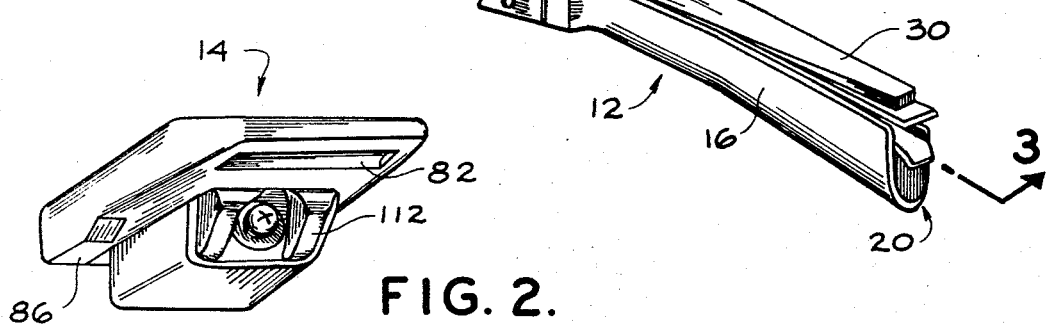
FIG. 2 is a perspective of the underside of the utensil side handle shown in FIG. 1.

Adjacent the opposing front edge of each sidewall 122 is an inwardly directed bracket 126. The brackets extend about transversely from the sidewalls and are spaced above the bottom edge thereof. The brackets are adapted to abut corresponding land portions 86 of the utensil side handle 14 (Only one abutment is shown in FIGS. 1 and 2).

It can be seen that each of the brackets are coextensive with the leading edge 130 of the housing member. In this manner one can determine whether the handle assembly 12 has been inserted for enough over the side handle to make the proper connection between connector portion 44 and depression 82. This is accomplished by visually observing whether the brackets are in contact with the utensil sidewall. Note that if one were to attempt to connect the detachable handle in its closed position with the utensil side handle, the upraised connector portion would prevent full insertion over the side handle. Of course, the brackets also provide leverage surfaces between the side handle and connector end 18.

While the invention has been described with respect to a preferred embodiment, it will be apparent to those skilled in the art that various modifications and improvements may be made without departing from scope and spirit of the invention. Accordingly, it is to be understood that the invention is not to be limited by the specific illustrative embodiment but only by the scope of the appended claims.

I claim:
1. A detachable handle assembly for connection to a utensil side handle having a top side and an underside comprising:
   a handle member having a connector end which includes two integral bifurcated upper extensions extending axially outwardly from said handle member each extension including under surfaces which match a corresponding top side surface of the utensil side handle and an integral lower extension having a terminal end which abuts against a corresponding portion of the utensil side handle underside when the handle assembly is engaged therewith, said handle member including an opposing outer end with an open channel along at least a major portion of the longitudinal axis thereof, with a rocker arm assembly pivotally connected proximate said outer end at a pivot portion thereof;
   an insert positioned about within said channel and connected to said member, said insert having a pivot end and a terminal end;
   a lever means affixed to said insert having first and second engagement portions, said first portion adapted to frictionally engage the utensil side han- dle underside and said second portion adapted to releasably engage said rocker arm assembly.

2. The handle assembly of claim 1 wherein said rocker arm assembly comprises a rocker arm having a midsection integral with a tab end section and a retainer end section each end section extending about transversely from said midsection in about opposite directions, said midsection including projection means adapted to cooperatingly engage the second engagement portion of said lever means.

3. The handle assembly of claim 2 wherein the corner juncture of said rocker arm midsection and said retainer end section is in rotatable contact with the pivot portion of said handle member, said rocker arm being maintained against said pivot portion by a pin means located adjacent said juncture.

4. The handle assembly of claim 3 wherein said insert and retainer end section are connected by compression spring biasing means.

5. The handle assembly of claim 4 wherein said handle member is substantially U-shaped in cross-section defining opposing sidewalls with said insert mounted for rotation proximate said pivot end by a shaft extending transversely through said insert and journaled to said opposing sidewalls, said tab end section of the rocker arm extending axially beyond the terminal end of said insert.

6. The handle assembly of claim 1 wherein said lever means first portion extends axially beyond said insert pivot end and is spaced vertically apart from said upper extension, said first portion further including a convex configuration for engagement with a concave depression on the underside of said utensil side handle when the handle assembly is engagement therewith.

7. The handle assembly of claim 6 wherein the connector end of said handle member is at least partially enclosed by a housing having a top wall and opposing sidewalls with each of said sidewalls including an inwardly directed bracket adapted for abutment against corresponding portions of the utensil side handle underside when the handle assembly is engaged therewith.

* * * * *